US012756544B2

(12) United States Patent
Cap et al.

(10) Patent No.: US 12,756,544 B2
(45) Date of Patent: Oct. 6, 2026

(54) FORWARD SECRECY QSL

(71) Applicant: QuSecure, Inc.

(72) Inventors: Chris Cap, Bayville, NJ (US); Sarah McCarthy, Carrickfergus (GB)

(73) Assignee: QuSecure, Inc, Petaluma, CA (US)

( * ) Notice: Subject to any disclaimer, the term of this patent is extended or adjusted under 35 U.S.C. 154(b) by 996 days.

(21) Appl. No.: 17/731,075

(22) Filed: Apr. 27, 2022

(65) Prior Publication Data

US 2023/0353349 A1 Nov. 2, 2023

(51) Int. Cl.
*H04L 9/08* (2006.01)
*H04L 9/06* (2006.01)
*H04L 9/30* (2006.01)

(52) U.S. Cl.
CPC .......... *H04L 9/0852* (2013.01); *H04L 9/0618* (2013.01); *H04L 9/085* (2013.01); *H04L 9/0861* (2013.01); *H04L 9/3073* (2013.01)

(58) Field of Classification Search
CPC ... H04L 9/0852; H04L 9/0858; H04L 9/0855; H04L 63/061; H04L 9/083; H04L 9/0822; H04L 9/3226; H04L 9/0891; H04L 9/14; H04L 9/0827; H04L 2209/24; H04L 9/08; H04L 9/0819; H04L 9/088; H04L 9/3066; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86
USPC ........ 713/150, 163, 171, 181; 726/2, 21, 36; 380/255, 264, 276
See application file for complete search history.

(56) References Cited

U.S. PATENT DOCUMENTS

| | | | | |
|---|---|---|---|---|
| 5,764,765 | A * | 6/1998 | Phoenix | H04L 9/0858 380/256 |
| 6,748,083 | B2 * | 6/2004 | Hughes | H04L 9/0858 380/278 |
| 7,437,081 | B2 * | 10/2008 | Mitchell | H04B 10/70 398/154 |
| 8,566,247 | B1 * | 10/2013 | Nagel | H04L 63/045 380/270 |
| 8,855,316 | B2 * | 10/2014 | Wiseman | H04L 9/0855 380/278 |
| 9,960,465 | B2 * | 5/2018 | Dudley | H01M 50/204 |
| 10,057,058 | B2 * | 8/2018 | Murakami | H04L 9/0858 |
| 11,245,527 | B2 * | 2/2022 | Uy | H04L 63/08 |
| 2005/0138352 | A1 * | 6/2005 | Gauvreau | H04L 9/3247 713/153 |

(Continued)

*Primary Examiner* — Sharif E Ullah

(57) ABSTRACT

A method for forward security Quantum Secure Layer (QSL), where the method causing a server to hold long-term public/private Key Encapsulation Mechanism (KEM) key-pair; uses KEM to establish a pre-master shared secret; causing the server to send ephemeral KEM public key to the client; uses KEM to establish master shared secret; and generates a session key by the server and encrypted to the client using the master shared secret. A method for forward secrecy Quantum Secure Layer (QSL), where the method causing a server to hold a pre-shared ephemeral public/private Key Encapsulation Mechanism (KEM) keypair; uses KEM to establish a master shared secret; and generates a session key by the server and encrypted to the client using the master shared secret.

20 Claims, 7 Drawing Sheets

(56) References Cited

U.S. PATENT DOCUMENTS

| | | | | |
|---|---|---|---|---|
| 2007/0065154 | A1* | 3/2007 | Luo | H04L 9/0852 398/141 |
| 2007/0076884 | A1* | 4/2007 | Wellbrock | H04L 9/0855 380/263 |
| 2007/0195774 | A1* | 8/2007 | Sherman | H04L 69/16 370/392 |
| 2008/0294726 | A1* | 11/2008 | Sidman | H04L 9/0825 380/259 |
| 2011/0206204 | A1* | 8/2011 | Sychev | H04J 14/06 380/256 |
| 2011/0213979 | A1* | 9/2011 | Wiseman | H04L 9/0844 713/171 |
| 2014/0010234 | A1* | 1/2014 | Patel | H04L 45/74 370/392 |
| 2014/0068765 | A1* | 3/2014 | Choi | H04L 63/1416 726/23 |
| 2014/0133652 | A1* | 5/2014 | Oshida | H04L 9/0897 380/255 |
| 2015/0288514 | A1* | 10/2015 | Pahl | H04L 63/166 713/171 |
| 2016/0241396 | A1* | 8/2016 | Fu | H04L 9/0836 |
| 2016/0359626 | A1* | 12/2016 | Fu | H04L 9/0858 |
| 2016/0366094 | A1* | 12/2016 | Mason | H04L 61/5038 |
| 2017/0063810 | A1* | 3/2017 | Bruce | H04L 63/126 |
| 2017/0214525 | A1* | 7/2017 | Zhao | H04W 12/0431 |
| 2017/0230173 | A1* | 8/2017 | Choi | H04L 9/0861 |
| 2018/0176091 | A1* | 6/2018 | Yoon | H04L 43/0888 |
| 2019/0036821 | A1* | 1/2019 | Levy | G06F 12/0868 |
| 2019/0349392 | A1* | 11/2019 | Wetterwald | H04L 43/0852 |
| 2020/0084222 | A1* | 3/2020 | William | H04L 63/12 |
| 2021/0391981 | A1* | 12/2021 | Okano | H04L 9/0869 |
| 2024/0106636 | A1* | 3/2024 | Nix | H04L 9/0852 |

* cited by examiner

FORWARD SECRECY QSL

RELATED APPLICATIONS

The applicant claims the benefit under 35 USC 119(e) of U.S. Provisional Application No. 63/319,323 filed on Mar. 13, 2022, which is incorporated herein by reference in its entirety.

BACKGROUND

The present invention relates to data encryption, and more specifically, to providing post-quantum communication security over a computer network.

SUMMARY

According to at least one embodiment of the present invention, this is a method for forward secrecy Quantum Secure Layer (QSL), whereby a server to holds a long-term public/private Key Encapsulation Mechanism (KEM) keypair, uses a KEM to establish a pre-master shared secret and causes the client to send an ephemeral KEM public key to the server, which uses a KEM to establish master shared secret and generates a session key which establishes encryption to the client using the master shared secret. According to at least one embodiment of the present invention, a method for forward secrecy Quantum Secure Layer (QSL), where the method causing a server to hold a pre-shared ephemeral public/private Key Encapsulation Mechanism (KEM) keypair; uses KEM to establish a master shared secret; and generates a session key by the server and establishes encryption to the client using the master shared secret.

According to at least another embodiment of the present invention, a server computer system for forward secrecy Quantum Secure Layer (QSL), the server computer system comprising a memory and at least one processor coupled to the memory, the server computer system is configured to cause a server to hold long-term public/private Key Encapsulation Mechanism (KEM) keypair, the server uses the KEM to establish a pre-master shared secret, a client computing device is configured to cause a client to send an ephemeral KEM public key to the server, and the server uses the KEM to establish a master shared secret, wherein a session key is generated by the server and establishes encryption to the client using the master shared secret.

BRIEF DESCRIPTION OF THE OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1A:
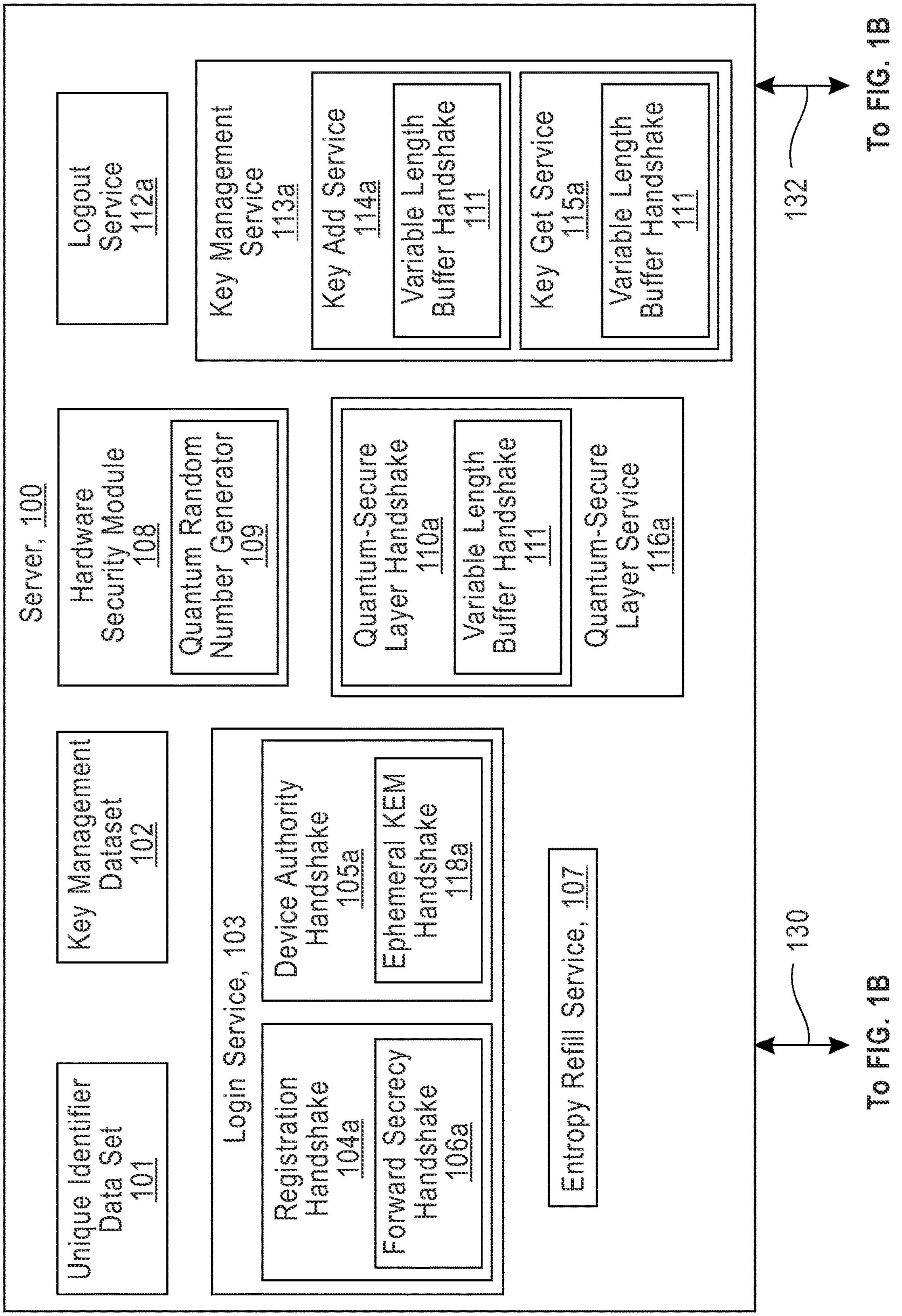
FIG. 1A is a block diagram of an example of a system in accordance with some implementations of the present invention.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Aspects of the invention are not limited in their application to the details of construction and the arrangement of the components set forth in the following description or illustrated in the drawings. The embodiments of the invention described herein are applicable to other embodiments or are capable of being practiced or carried out in various ways. The phraseology and terminology employed herein are for the purpose of description and should not be regarded as limiting. As will be appreciated by one skilled in the art, aspects of the present invention can be embodied as a system, method or computer program product.

Many of the most notorious cybersecurity hacks have been the result of SNDL campaigns (steal now, decrypt later) in which a bad actor will steal an encrypted data source and sit on it for several months or years until they are able to decrypt it. Once decrypted, the data is then distributed or sold on the dark web.

Figure 1B:
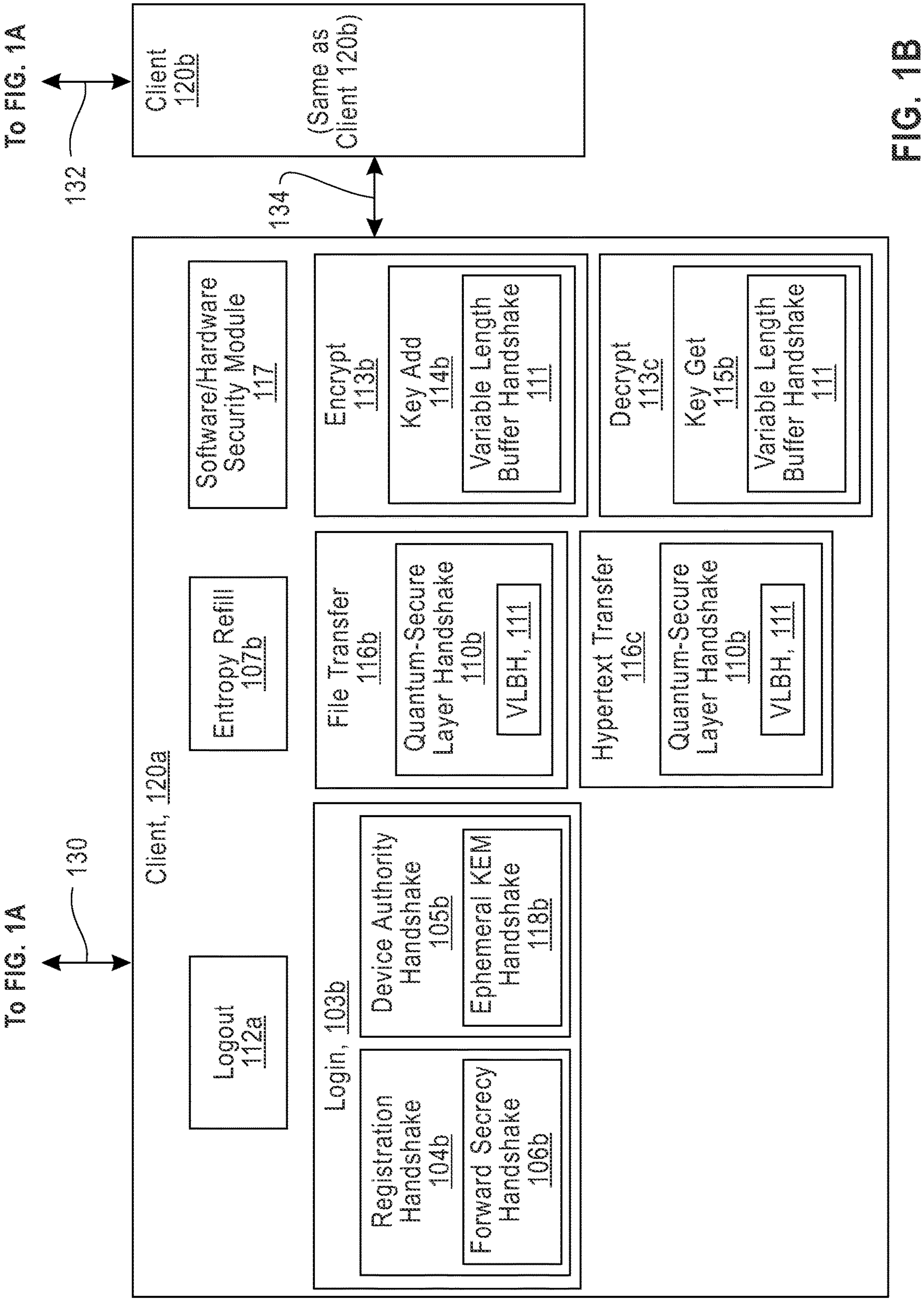
FIG. 1B is a block diagram of an example of a Server belonging to a system for handshaking, without a certificate authority, to provide at least post-quantum communications security over a computer network, in accordance with some implementations of the present invention.

With reference to FIGS. 1A and 1B, shown is a current preferred embodiment of the invention. In this illustration, the aspects as described within this disclosure show the elimination of unnecessary steps in the negotiation during the security handshake protocol. These steps include customization of the client/server behavior regarding the elimination of the need for certificate exchange and a trusted Root Certificate Authority (CA) that generates self-signed public key used to distribute signed public/private key pairs down the certificate chain to sub-CAs. Additionally, the invention creates a zero trust negotiation during QSL handshake to provide a post-quantum secure security protocol.

Forward Secrecy (FS) is a property relating to key agreement protocols, for instance between a client and a server, which states that if the server's private key is compromised, all past communications will remain secure. TLS1.3 instantiates Ephemeral Diffie-Hellman key exchange in its handshake, which provides FS. This is because the server generates a one-time secret which is discarded after each session. Without this ephemeral key, an adversary cannot retrieve the established key (unless they break the cipher itself). Furthermore, if they somehow retrieve the current secret key of the server, it does not provide any information about the past secrets or session keys. Hence, we say it provides FS.

However, in QSL the invention uses a post-quantum Key Encapsulation Mechanism (KEM) to establish shared secrets, to share the session keys. In QSL, the long-term secret is the Server's private key. The session key is a QRNG-derived key, generated by the server, and sent to the client under encryption by a "master" shared secret. This master shared secret is the output of ephemeral KEM key exchange. The method by which this is performed guarantees FS.

One way the invention demonstrates the FS of QSL is as followed. Suppose the long-term KEM private key of the server is compromised, and the adversary has recorded all previous executions of the protocol. Due to the design of FS-QSL, the adversary would at best be able to obtain copies of the ciphertext of the master shared secret, encapsulated under the ephemeral KEM key of that session. Hence, they would not be able to retrieve the session key of past sessions and forward secrecy is achieved.

On implementing FS-QSL, the invention makes use of post-quantum KEMs. The invention requires running the key generation for each login. Kyber is particularly well suited to this due to its efficient key generation process. The BIKE submission also states that it lends itself well to the ephemeral setting.

FIGS. 1A and 1B show a block diagram of System 140, an example of a system for handshaking without a certificate authority, to provide at least post-quantum communications security over a computer network. The system 140 includes a server 100, clients 120*a* and 120*b*, and a communication networks 130, 132, 134. The System 140 illustrated in FIGS. 1A and 1B is provided as one example of such a system. The methods described herein may be used with systems with fewer, additional, or different components in different configurations than the System 140 illustrated in FIGS. 1A and 1B. For example, in some implementations, the Server 100 may include additional servers, may include additional or fewer clients, and/or may include more communication networks. Although illustrated as separate components in FIG. 1A, in some implementations, the Server 100 and one or more clients 120*a* and 120*b* may be included in a single electronic device. For example, the Server 100 and the initiator 120*a* or 120*b* may be included in a single electronic device. As a further example, the Server 100 and the recipient 120*a* or 120*b* may be included in a single electronic device.

Figure 1C:
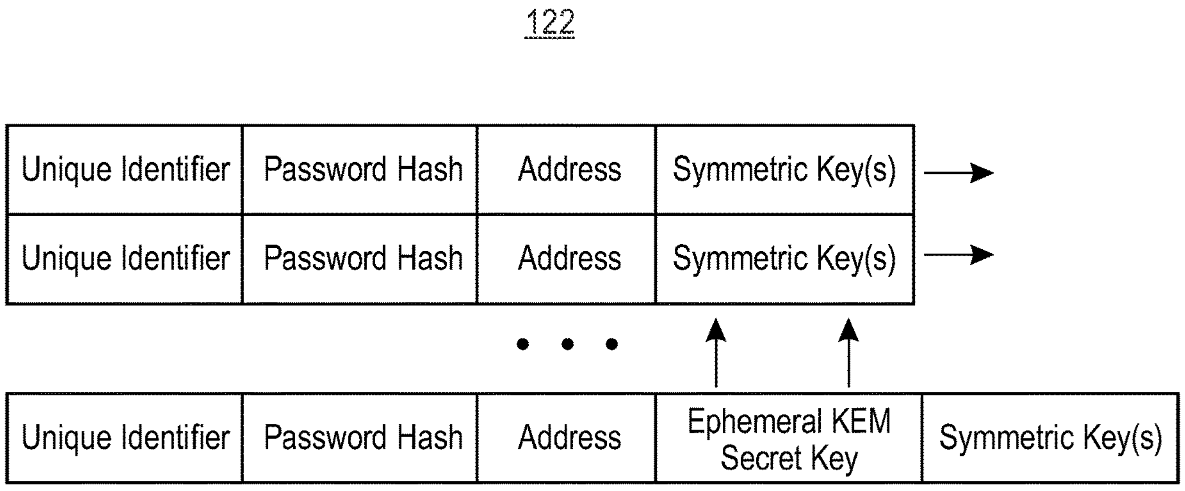
FIG. 1C is a block diagram of an example of interacting Clients 120*a* and 120*b* belonging to a system for handshaking, without a certificate authority, to provide at least post-quantum communications security over a computer network, in accordance with some implementations of the present invention.

Unique Identifier Dataset FIG. 1C 101 illustrates the current preferred embodiment of the database scheme used to identify a unique entity for communication with the Quantum Secure Layer (QSL) Service 116*a* or the Key Management Service 113*a*. This communication uses the data structure to complete the handshake as in Quantum Secure Layer Handshake 110*b* for the purpose of encrypting the necessary data and keys between multiple clients 120*a* or 120*b*, and to complete the handshake as in Key Add Service 114*a* or Key Get Service 115*a* for the purpose of encrypting the necessary data and keys for a single client 120*a* or 120*b*.

Figure 1D:
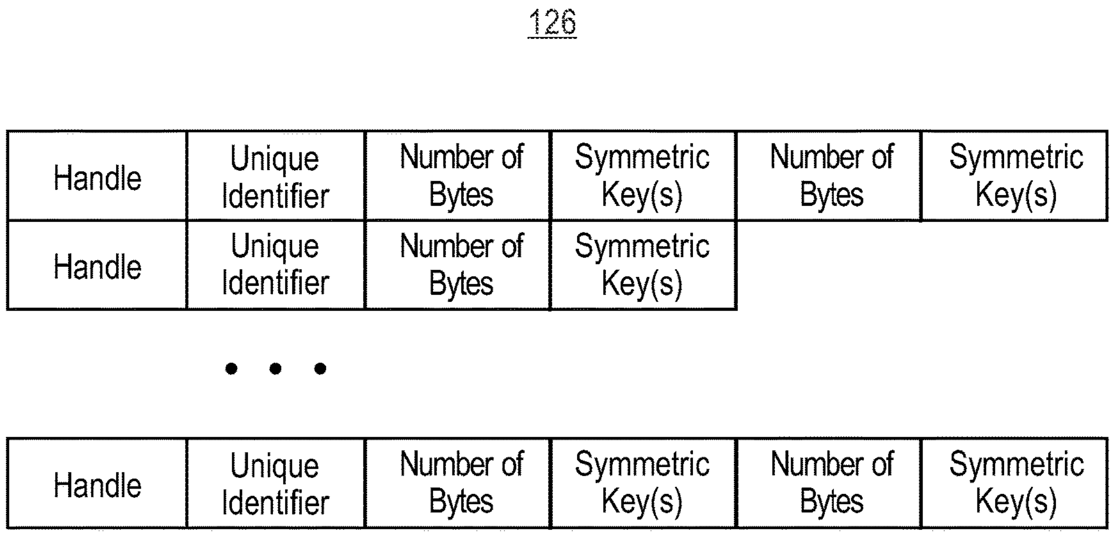
FIG. 1D is a block diagram of an example structure of a unique identifier dataset, in accordance with some implementations of the present invention.

Key Management Dataset FIG. 1D 102 illustrates the current preferred embodiment of the database scheme used to identify elements within the Key Management Service 113*a*. The Key Management Dataset 102 FIG. 1D is used to add symmetric keys when requested from other services using Key Add Service 114*a*, and to use keys that are in the processes with the Key Get Service 115*a*. Because the Key Management Service 113*a* resides within the Hardware Security Module logic construct an actual "Handle" is used versus the key for better security retrieval.

Hardware Security Module (HSM) FIG. 1A 108 all KEM and cryptographic operations are controlled though the HSM. This component has all cryptographic algorithms and systems logic to avoid security side channel attacks on key pairs or symmetric keys, not limited to other elements requiring vaulting protection. The Hardware Security Module (HSM) 108 controls but is not limited to key creation and extraction from the Quantum Random Number Generator 109 and associated storage.

Quantum Random Number Generator (QRNG) FIG. 1A 109 QRNG delivers random numbers to act as cryptographic keys and other security parameters, deterministic RNG seeding, initialization vectors, nonces, random challenges, authentication and DSA signing. Other applications include Entropy as a Service (EaaS), simulations, modeling and computer gaming. This generator feeds the cryptographic keys directly into the Hardware Security Module for greater entropy security retrieval. Other outside processes are shielded from this generator. Only protocols that reside within the HSM can access the n-dimensional quantum key source that is produced.

Quantum Secure Layer Service FIG. 1A 116*a* This component uses the Quantum Secure Layer Handshake 110*a* which is the interaction between key distribution center and client 120*a* or 120*b*. QSL Service 116*a* is used by the Clients 120*a* and 120*b* to create a secure communications session between the two clients. This supplies the necessary symmetric key by reaching out to the Hardware Security Module (HSM) 108. The interaction between the client peers requests a communication with the necessary unique identifier to establish communications for but not limited to file transfer, messaging and hypertext communications. This service will query all information required from the Unique Identifier Dataset 101 to establish communication including but limited to symmetric keys. This follows File Transfer 116*b* and Hypertext Transfer 116*c* as it interacts with the Quantum Secure Layer Handshake 110*a* and the Quantum Secure Layer Service 116*a*.

Quantum Secure Layer Handshake FIG. 1A 110*b* This handshake is used to interact with any application with the examples of File Transfer 116*b* and Hypertext Transfer 116*c*. Any initiating client will pass their Unique Identification and the Unique Identification of its recipient to the QSL Service 116*a* at which time the symmetric session keys will be generated. The QSL Service 116*a* will encrypt these symmetric keys with post-quantum algorithms used within the Hardware Security Module 108 and the relevant moving target information. This is performed using the recipient client's symmetric key that was established during the Login Service 103*a* so only the recipient can decrypt that particular portion and then using the symmetric key the initiator established during the Login Service 103*a* so only the initiator can decrypt, thereby verifying it came from the Quantum Secure Layer Service 116*a*.

Variable Length Buffer Handshake FIG. 1A 111 to create a handshake for transferring a buffer of variable length to be used by all services involving a logged-in client, reliant only on Authenticated Encryption with Associated Data (AEAD). The length is sent over followed by the buffer to ensure the recipient has the correct size to read.

Variable Length Buffer Handshake Steps:

1. The initiator sends the length of buffer to the recipient using AEAD;
2. The initiator sends the buffer to the recipient using AEAD.

Login Service FIG. 1A 103a Client authentication, login 103b on the client would communicate with the login service 103a to perform authentication. Other components that are contained within this include but not limited to organization onboarding, administration onboarding, and individual client onboarding. FIG. 1A and FIG. 1B represent 2 clients in an organization that communicate to the Server 100. This also implies multi-tenancy communication from client 120a and 120b to Server 100. An additional component within the Login Service 103a is the Registration Handshake 104a to identify the individual clients to the Server 100. This populates the unique identifier 101 FIG. 1C for the first time within the Server 100. The unique identifier elements and post-quantum token will be passed to the client. Other elements that are captured include items such as, IP address, MAC, routing address.

As part of the registration the client will need to perform the Forward Secrecy Handshake 106a and that includes communication with the key encapsulation system of the Server 100 using but not limited to Saber or Kyber Post Quantum algorithms. These associate a post quantum key pair structure the Server 100 retains the secret key portion of the pair structure. The Client 120a, Client 120b receives the public key portion and uses said key to establish a shared secret or symmetric key with Server 100. This process then creates a second post quantum key pair communicated using the symmetric key to transmit in a protected manner thus reducing the probability of interception of the communication and data. This second post quantum key pair is unique to each session; for data to be compromised, the Server 100 secret key and the second secret key must be broken to get access to the data or session.

Device Authority Handshake FIG. 1A 105b is used when the Client 120a, or 120b need to log into the system. This is accomplished by using the unique identifier and post quantum token with the same Forward Secrecy Handshake 106b to establish the client's authentication from the Unique Identifier Dataset 101 FIG. 1C. The Server 100 and Device Authority Handshake 105 will update the symmetric key of Unique Identifier Dataset 101 FIG. 1C at login for the individual client unique identifiers. In some embodiments, the Registration Handshake and Device Authority Handshake can be configured to generate and share an ephemeral KEM public key with the client at their conclusion. In such an embodiment, the Forward Secrecy Handshake is not needed by the Device Authority Handshake—since the client can initiate the handshake with an ephemeral KEM public key. The resulting Ephemeral KEM Handshake 118b used allows for a login with a reduced number of roundtrips.

Logout Service FIG. 1A 112a clears the dataset symmetric keys associated with the unique identifier at close of session. Logout 112b has access to Unique Identifier Dataset 101 associated FIG. 1C. The Logout Service offloads symmetric encryption/decryption to the HSM. The Logout Service pulls in the symmetric key(s) and routing address associated with relevant unique identifiers from Unique Identifier Dataset. The Logout Service may be activated by a lack of a response from the relevant client.

Authentication of clients and establishing a connection through cryptography. KEM utilization which gives a performance advantage over Digital Signature utilization.

Entropy Refill FIG. 1B 107b is used during high volume communications to replenish the clients 120a or 120b entropy pool to continue the post-quantum secure communication or Data at Rest process. The Entropy Refill Service offloads symmetric encryption/decryption to the HSM. The Entropy Refill Service provides bulk entropy from the QRNG to the client to maintain the Client's entropy pool, the advantage allows offline and high-volume key availability. The Entropy Refill Service pulls in the symmetric key(s) and routing address associated with relevant unique identifiers from Unique Identifier Dataset.

Key Management Service FIG. 1A 113a The KMS pulls in the symmetric key(s) and routing address associated with relevant unique identifiers from Unique Identifier Dataset.

Key Add Service FIG. 1A 114a and Key Add FIG. 1B 114b Add symmetric keys encrypted with HSM into the Server 100 database encryption keys system. This data is stored externally but cannot be access without the HSM to decrypt prior to transmittal. The Key Management Dataset FIG. 1D contains the information used in this process.

Key Get Service FIG. 1A 115a and Key Get FIG. 1B 115b reaches out to HSM to get keys get decrypted key from database.

File Transfer FIG. 1B 116b File Transfer uses the QSL Handshake to receive session keys from the QSL Service for a secure connection with a peer. File Transfer then utilizes the functions provided by the QSL Library (libqsl) for the QSL equivalent of the TLS Record Protocol. Symmetric encryption/decryption (AEAD) is offloaded to the S/HSM.

HyperText Transfer FIG. 1B 116c Hypertext Transfer uses the QSL Handshake to receive session keys from the QSL Service for a secure connection with a peer. Hypertext Transfer then utilizes the functions provided by the QSL Library (libqsl) for the QSL equivalent of the TLS Record Protocol. Symmetric encryption/decryption (AEAD) is offloaded to the S/HSM.

Encrypt FIG. 1B 113b Encrypt (Data-At-Rest) utilizes Key Add 114b to reach out to the Key Management Service 113a, specifically the Key Add Service 114a to get encryption keys. Encrypt encrypts the data using the Moving Target Design to switch between encryption keys. Symmetric encryption (AEAD) is offloaded to the S/HSM.

Key Add Service 114b adds symmetric keys encrypted with HSM into the Server 100 database encryption keys system. This data is stored externally but cannot be accessed without the HSM to decrypt prior to transmittal. The Key Management Dataset FIG. 1D contains the information used in this process.

Decrypt FIG. 1B 113c Decrypt (Data-At-Rest) utilizes Key Get 115b to reach out to the Key Management Service 113a, specifically the Key Get Service 115a to get decryption keys. Decrypt decrypts the data using the Moving Target Design to switch between decryption keys. Symmetric decryption (ADAD) is offloaded to the S/HSM. Key Get Service 115a reaches out to HSM to get keys get decrypted key from database.

Figure 2:
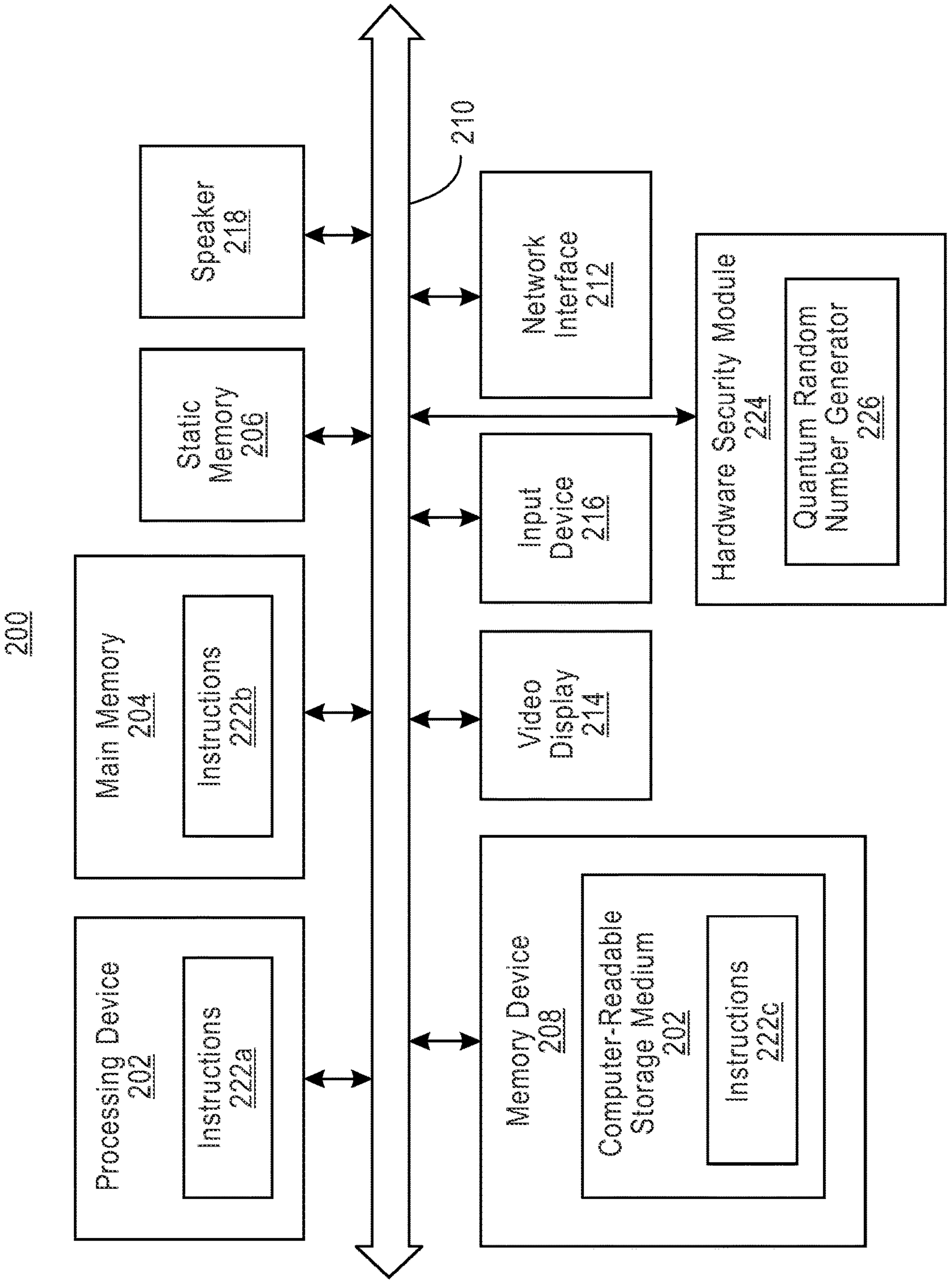
FIG. 2 is a block diagram of an example of a computer system, in accordance with some implementations of the present invention.

FIG. 2 is a block diagram of an example computer system 200 which can perform any one or more of the methods described herein, in accordance with one or more aspects of the present disclosure. In one example, the computer system 200 may include a computing device and correspond to one or more of the servers 100, the client 120a, 120b, or any suitable component of FIG. 1A. The computer system 200 may be connected (e.g., networked) to other computer systems in a local area network (LAN), an intranet, an extranet, or the Internet, including via the cloud or a peer-to-peer network. The computer system 200 may operate in the capacity of a server in a client-server network environment. The computer system 200 may be a personal computer (PC), a tablet computer, a wearable (e.g., wristband), a set-top box (STB), a personal Digital Assistant (PDA), a mobile phone, a smartphone, a camera, a video camera, an Internet of Things (IoT) device, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 200 (one example of a "computing device") illustrated in FIG. 2 includes a processing device 202, a main memory 204 (e.g., read-only memory (ROM), flash memory, solid state drives (SSDs), dynamic random access memory (DRAM) such as synchronous DRAM (SDRAM)), a static memory 206 (e.g., flash memory, solid state drives (SSDs), or static random access memory (SRAM)), and a memory device 208, wherein any of the foregoing may communicate with each other via a bus 210. In some implementations, the computer system 200 may further include a hardware security module (not shown).

The processing device 202 represents one or more general-purpose processing devices such as a microprocessor, central processing unit, or the like. More particularly, the processing device 202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 202 may also be one or more special-purpose processing devices such as an application specific integrated circuit (ASIC), a system on a chip, a field programmable gate array (FPGA), a digital signal processor (DSP), network processor, or the like. The processing device 202 may be configured to execute instructions for performing any of the operations and steps discussed herein.

The computer system 200 illustrated in FIG. 2 further includes a network interface device 212. The computer system 200 also may include a video display 214 (e.g., a liquid crystal display (LCD), a light-emitting diode (LED), an organic light-emitting diode (OLED), a quantum LED, a cathode ray tube (CRT), a shadow mask CRT, an aperture grille CRT, or a monochrome CRT), one or more input devices 216 (e.g., a keyboard and/or a mouse or a gaming-like control), and one or more speakers 218 (e.g., a speaker). In one illustrative example, the video display 214 and the one or more input devices 216 may be combined into a single component or device (e.g., an LCD touchscreen).

The memory device 208 may include a computer-readable storage medium 202 on which the instructions 222*c* embodying any one or more of the methods, operations, or functions described herein are stored. The instructions 222*c* may also reside, completely or at least partially, within the main memory 204 as instructions 222*b* and/or within the processing device 202 during execution thereof by the computer system 200. As such, the main memory 204 or as instruction 222*a* and the processing device 202 also constitute computer-readable media. The instructions 222 may further be transmitted or received over a network via the network interface device 212.

While the computer-readable storage medium 220 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium capable of storing, encoding or carrying out a set of instructions for execution by the machine and that cause the machine to perform any one or more of the methods disclosed herein. The term "computer-readable storage medium" shall accordingly be taken to include, but not be limited to, solid-state memories, optical media, and magnetic media.

While the computer system environment of 200 shows the basic components, the addition of a Hardware Security Module 224 associated with a Quantum Random Number Generator 226 completes the entropy required for Post Quantum computations and interactions. The use of these components is critical as described previously in the overall methods used for this system.

The present invention may be a system, a method, and/or a computer program product. The computer program product may include a computer readable storage medium (or media) having computer readable program instructions thereon for causing a processor to carry out aspects of the present invention.

The computer readable storage medium 202 can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions 222*c* described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions 222*c* for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions 222*c* may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 3:
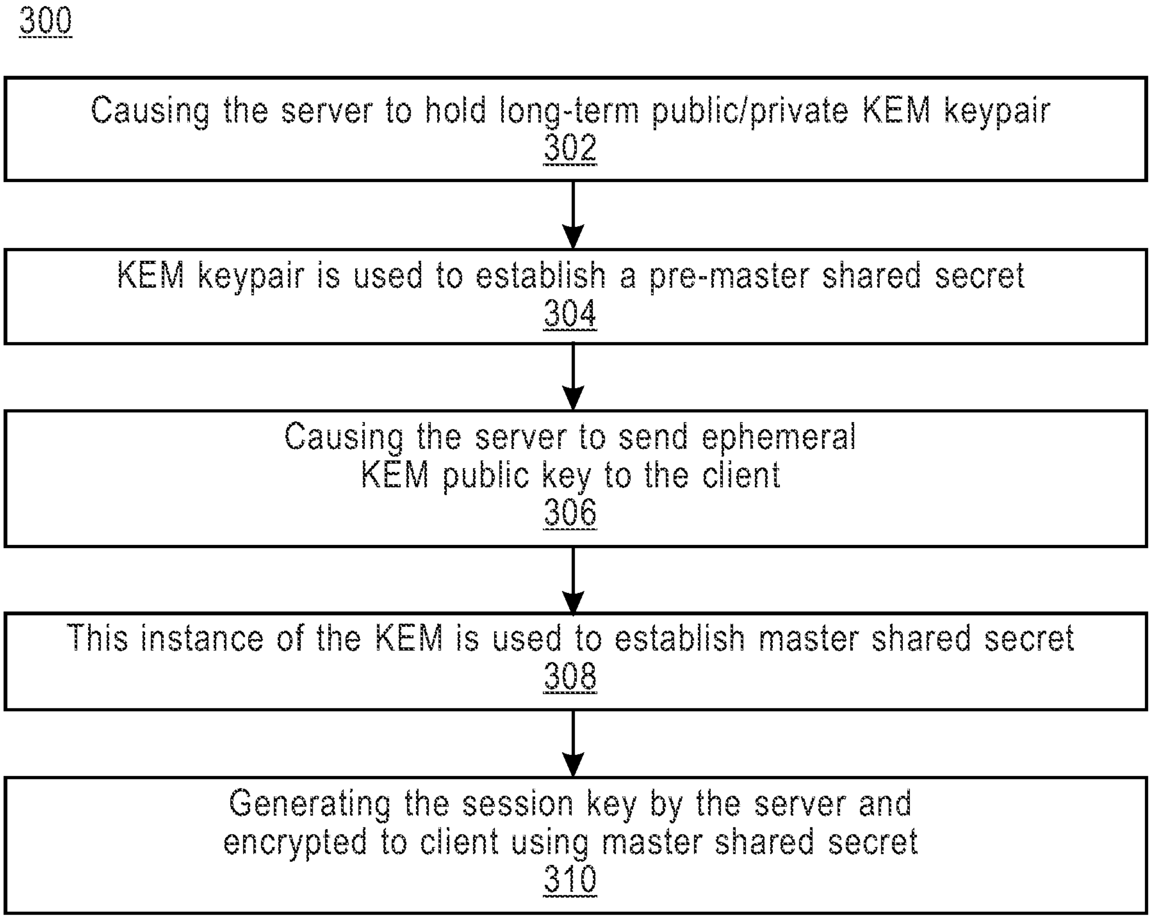
FIG. 3 is a flow diagram of an example of a method for forward secrecy Quantum Secure Layer (QSL), in accordance with some implementations of the present invention.

Referring to FIG. 3 a flow diagram of an example method for forward security Quantum Secure Layer (QSL). The method includes causing a server to hold long-term public/private Key Encapsulation Mechanism (KEM) keypair 302, using KEM to establish a pre-master shared secret 304. The method causing the client to send ephemeral KEM public key to the server 306, using KEM to establish master shared secret 308, and generating a session key by the server and encrypted to the client using the master shared secret 310.

Figure 4:
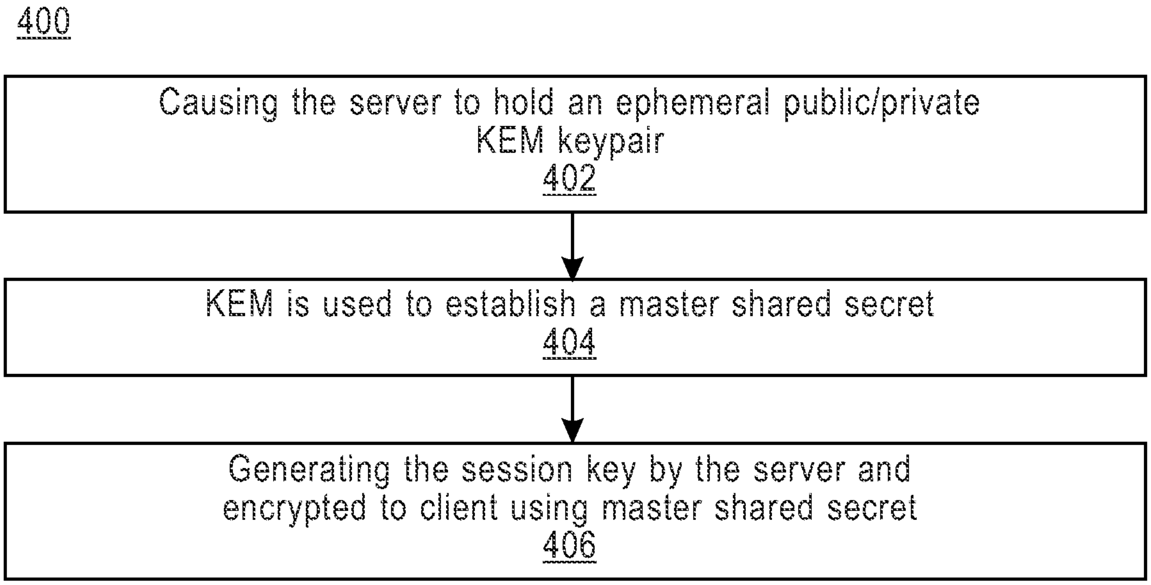
FIG. 4 is a flow diagram of an example of another method for forward secrecy Quantum Secure Layer (QSL), the Forward Secrecy Handshake 106 in accordance with some implementations of the present invention.

Referring to FIG. 4 a flow diagram of an example method for forward security Quantum Secure Layer (QSL). The method includes causing a server to hold an ephemeral public/private Key Encapsulation Mechanism (KEM) keypair 402, using KEM to establish a master shared secret 404, and generating a session key by the server and encrypted to the client using the master shared secret 406.

Figure 5:
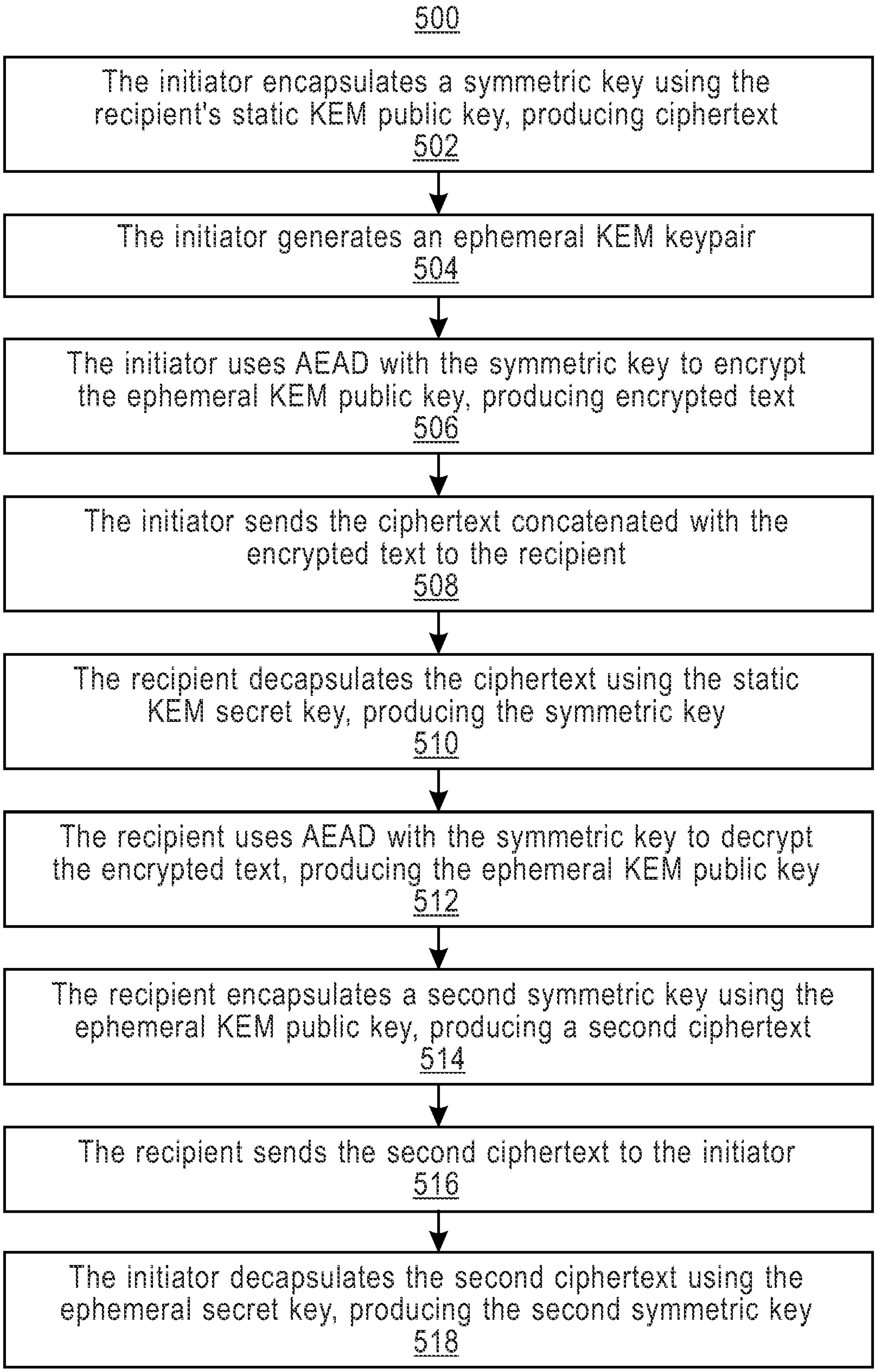
FIG. 5 is a flow diagram of an example of another method for forward secrecy Quantum Secure Layer (QSL), in accordance with some implementations of the present invention.

Referring to FIG. 5 a flow diagram of another example method for forward security Quantum Secure Layer (QSL). Forward Secrecy Handshake 500 The Forward Secrecy Handshake allows two parties to establish forward secrecy using Key Encapsulation Mechanisms. The first shared secret is exchanged using a static KEM keypair. The shared secret is then used to exchange an ephemeral KEM keypair, which is used to establish a second shared secret. The second shared secret is not vulnerable if the long-term secret, the static KEM key pair, is compromised. Blocks 502-518 show a sequence of establishing proper secrecy novel and highly protective.

Still referring to FIG. 5, the method causes the client to encapsulate a symmetric keypair using the server's static KEM public key to produce a ciphertext 502, which causes the client to generate an ephemeral KEM keypair 504, which causes the client to use Authenticated Encryption with Associated Data (AEAD) with the symmetric keypair to encrypt the ephemeral KEM public key to produce encrypted text 506, and this causes the client to send the ciphertext concatenated with the encrypted text to the server 508. The method still further causes the server to decapsulate the ciphertext using their static KEM secret key to produce the symmetric keypair 510, causing the server to use AEAD with the symmetric keypair to decrypt the encrypted text by producing the ephemeral KEM public key 512, causing the server to encapsulate a second symmetric keypair by using the client's ephemeral KEM public key to produce a second ciphertext 514, causing the server to send the second ciphertext to the server 516 and causing the client to decapsulate the second ciphertext using their ephemeral KEM secret key to produce the second symmetric keypair 518.

Figure 6:
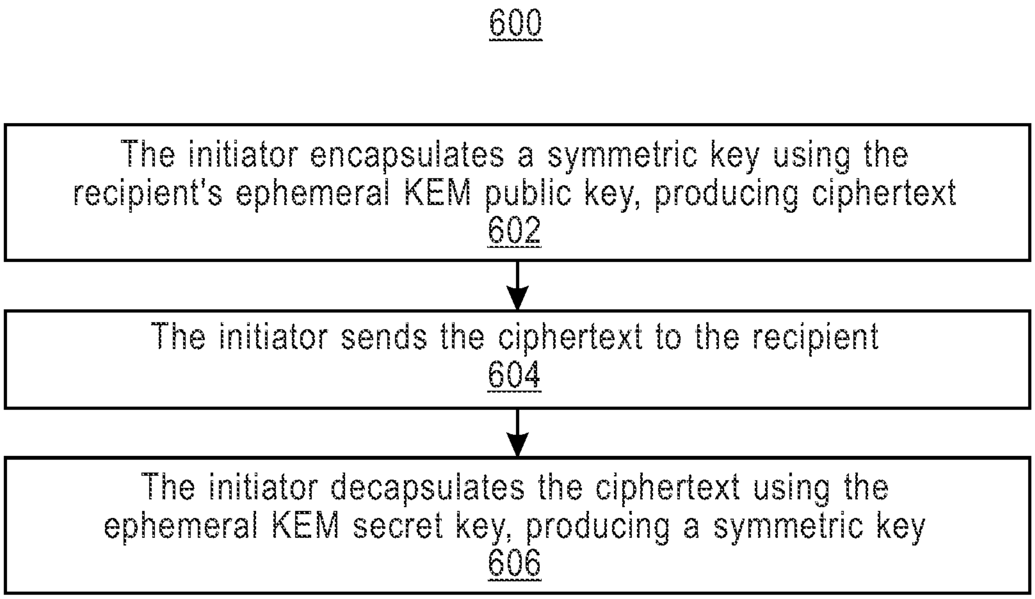
FIG. 6 is a flow diagram of an example of another method for forward secrecy Quantum Secure Layer (QSL), the Ephemeral KEM Handshake 118 in accordance with some implementations of the present invention.

Referring to FIG. 6 a flow diagram of another example method for forward security Quantum Secure Layer (QSL). Ephemeral KEM Handshake 600 The Ephemeral KEM Handshake allows two parties to establish forward secrecy using Key Encapsulation Mechanisms. An ephemeral KEM keypair is used to establish a shared secret. The shared secret is not vulnerable since there is no long-term secret. Block 602-606 show a sequence of establishing proper secrecy novel and highly protective.

Still referring to FIG. 6, the method causes the client to encapsulate a symmetric keypair using the server's ephemeral KEM public key to produce a ciphertext 602, which causes the client to send the ciphertext to the server 604, and causes the server to decapsulate the ciphertext using their ephemeral KEM secret key to produce the symmetric keypair 606.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for forward secrecy Quantum Secure Layer (QSL), wherein the method comprises:
- causing a server to hold a long-term public/private Key Encapsulation Mechanism (KEM) keypair based on one or more post-quantum algorithms;
- using the post-quantum KEM to establish a pre-master shared secret;
- causing a client to send an ephemeral post-quantum KEM public key to the server;
- using the post-quantum KEM to establish a master shared secret; and
- generating a session key by the server and establishing encryption to the client using the master shared secret.

2. The method according to claim 1, wherein the method further comprises:
- using a handshake that utilizes a static Key Encapsulation Mechanism (KEM) keypair to establish perfect forward secrecy.

3. The method according to claim 2, wherein the method further comprises:
- causing the client to encapsulate a symmetric key using the server's static KEM public key to produce a ciphertext.

4. The method according to claim 3, wherein the method further comprises:
- causing the client to generate an ephemeral KEM keypair.

5. The method according to claim 4, wherein the method further comprises:
- causing the client to use Authenticated Encryption with Associated Data (AEAD) with the symmetric key to encrypt the ephemeral KEM public key to produce encrypted text.

6. The method according to claim 5, wherein the method further comprises:
- causing the client to send the ciphertext concatenated with the encrypted text to the server.

7. The method according to claim 6, wherein the method further comprises:
- causing the server to decapsulate the ciphertext using their static KEM secret key to produce the symmetric key.

8. The method according to claim 7, wherein the method further comprises:
- causing the server to use AEAD with the symmetric key to decrypt the encrypted text by producing the ephemeral KEM public key.

9. The method according to claim 8, wherein the method further comprises:
- causing the server to encapsulate a second symmetric key by using the client's ephemeral KEM public key to produce a second ciphertext.

10. The method according to claim 9, wherein the method further comprises:
- causing the server to send the second ciphertext to the client.

11. The method according to claim 10, wherein the method further comprises:
- causing the client to decapsulate the second ciphertext using their ephemeral KEM secret key to produce the second symmetric key.

12. A method for forward secrecy Quantum Secure Layer (QSL), wherein the method comprises:
- causing a server to hold a pre-shared public/private Key Encapsulation Mechanism (KEM) keypair based on a post-quantum cryptographic algorithm;
- using the post-quantum KEM to establish a master shared secret; and
- generating a session key by the server and establishing encryption to a client using the master shared secret.

13. The method according to claim 12, wherein the method further comprises:
- using a handshake that utilizes a pre-shared ephemeral Key Encapsulation Mechanism (KEM) keypair to establish perfect forward secrecy.

14. The method according to claim 13, wherein the method further comprises:
- causing the client to encapsulate a symmetric key using the server's ephemeral KEM public key to produce a ciphertext.

15. The method according to claim 14, wherein the method further comprises:
- causing the client to send the ciphertext to the server.

16. The method according to claim 15, wherein the method further comprises:
- causing the server to decapsulate the ciphertext using their ephemeral KEM secret key to produce the symmetric key.

17. A server computer system for forward secrecy Quantum Secure Layer (QSL), the server computer system comprising a memory and at least one processor coupled to the memory, wherein:

the server computer system is configured to cause a server to hold a long-term public/private post-quantum cryptographic algorithm Key Encapsulation Mechanism (KEM) keypair;

the server uses the post-quantum KEM to establish a pre-master shared secret;

a client computing device is configured to cause a client to send an ephemeral post quantum KEM public key to the server; and the server uses the post-quantum KEM to establish a master shared secret, wherein a session key is generated by the server and establishes encryption to the client using the master shared secret.

18. The server computer system according to claim 17, wherein the server computer system uses a handshake that utilizes a static Key Encapsulation Mechanism (KEM) keypair to establish perfect forward secrecy.

19. The server computer system according to claim 18, wherein the server computer system causes the client to encapsulate a symmetric key using the server's static KEM public key to produce a ciphertext.

20. The server computer system according to claim 19, wherein server computer system causes the client to generate an ephemeral KEM keypair.

* * * * *